Dec. 1, 1964  B. R. SHEAFFER ETAL  3,159,364
AMPHIBIOUS FLOATS WITH RETRACTION MEANS THEREFOR
Filed July 9, 1962  7 Sheets-Sheet 1

INVENTORS
Bruce R. Sheaffer &
Daniel R. Zuck

BY
ATTORNEY

INVENTORS
Bruce R. Sheaffer &
Daniel R. Zuck

BY *Herbert M. Birch*

ATTORNEY

Dec. 1, 1964  B. R. SHEAFFER ETAL  3,159,364
AMPHIBIOUS FLOATS WITH RETRACTION MEANS THEREFOR
Filed July 9, 1962  7 Sheets-Sheet 4

INVENTORS
Bruce R. Sheaffer &
Daniel Zuck
BY
Herbert M. Birch
ATTORNEY

Dec. 1, 1964   B. R. SHEAFFER ETAL   3,159,364
AMPHIBIOUS FLOATS WITH RETRACTION MEANS THEREFOR
Filed July 9, 1962   7 Sheets-Sheet 5

INVENTORS
Bruce R. Sheaffer &
Daniel R. Zuck

BY *Herbert M. Birch*

ATTORNEY

Dec. 1, 1964  B. R. SHEAFFER ET AL  3,159,364
AMPHIBIOUS FLOATS WITH RETRACTION MEANS THEREFOR
Filed July 9, 1962  7 Sheets-Sheet 6
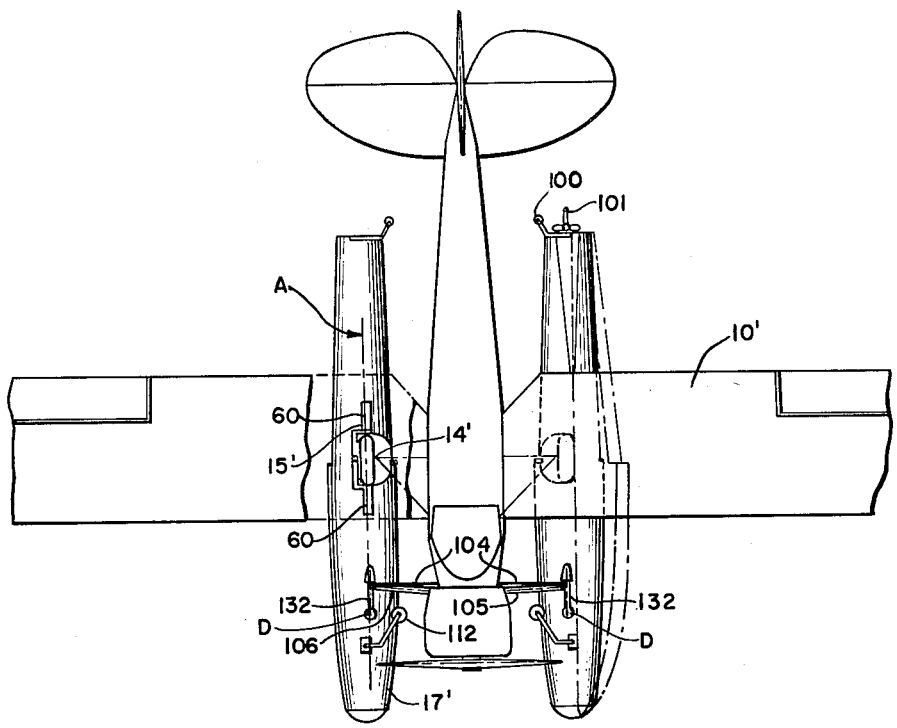
FIG. 13.
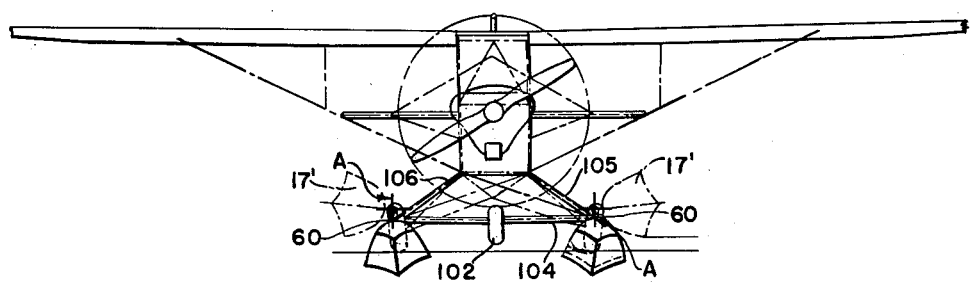
FIG. 14.
INVENTORS
Bruce R. Sheaffer &
Daniel R. Zuck
BY 
ATTORNEY Dec. 1, 1964    B. R. SHEAFFER ETAL    3,159,364
AMPHIBIOUS FLOATS WITH RETRACTION MEANS THEREFOR
Filed July 9, 1962    7 Sheets-Sheet 7
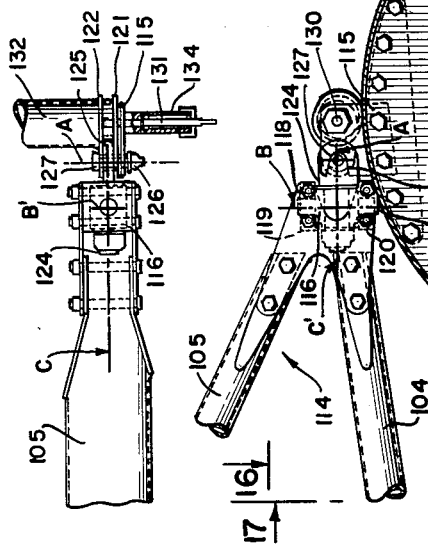
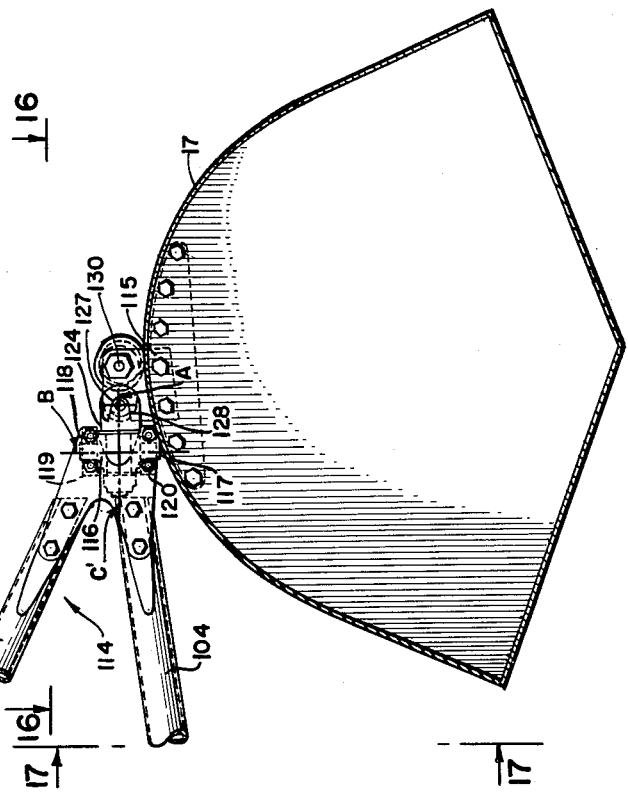
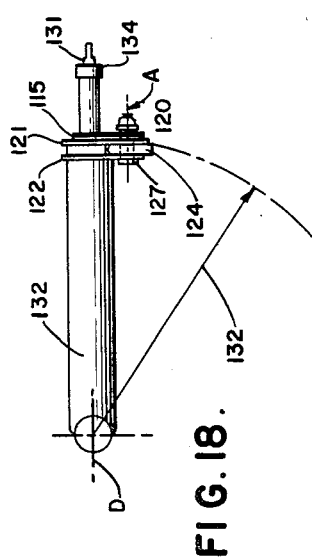
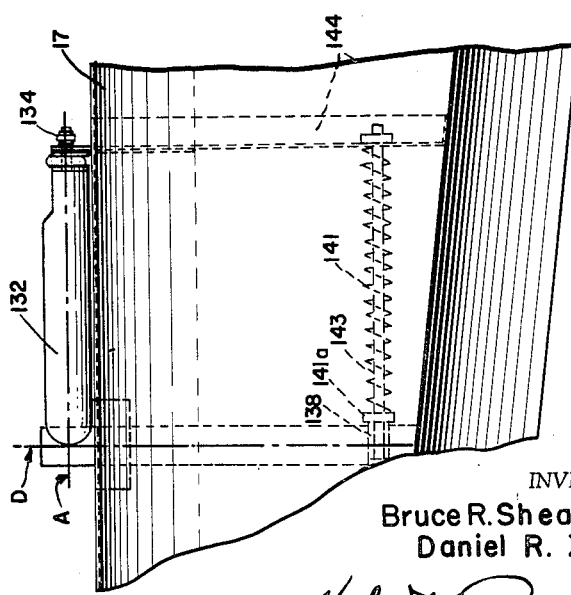
INVENTORS
Bruce R. Sheaffer &
Daniel R. Zuck
BY
ATTORNEY

United States Patent Office 3,159,364
Patented Dec. 1, 1964

3,159,364
AMPHIBIOUS FLOATS WITH RETRACTION
MEANS THEREFOR
Bruce R. Sheaffer, 4 Kemble Court, Hyde Park, Wilmington, Del., and Daniel R. Zuck, 14273 Beaver St., San Fernando, Calif.
Filed July 9, 1962, Ser. No. 208,320
14 Claims. (Cl. 244—101)

The present invention relates to aircraft and more particularly to aircraft equipped with a landing gear having floats adaptable for take-off and landing from land or water.

Heretofore aircraft adaptable for land and/or water operation have been equipped with landing gear including the usual landing wheels or fixed pontoons or floats inhibiting the aircraft to non-amphibious operations. The floats of this invention are movable to freely expose the landing wheels of a conventional land plane for land operation or they are movable to water landing or take-off positions with respect to the landing wheels giving a conventional land plane amphibious qualities.

Accordingly, an object of this invention is to provide a float equipped landing gear adapted to provide landing and take-off for land or water, whereby the float members are mounted with respect to the landing wheel axes for three axes of movement when landing or taking off from land or water.

Another object is to provide a novel float having three axes of movement with respect to a cantilevered landing wheel axle, so shaped and so proportioned as to confine or expose the landing wheel of the undercarriage of an aircraft when moved about one axis of movement thereof, or which float is adaptable to be moved about a second axis when used for ground landing and take-off for trim adjustment, and finally whereby the float is adaptable to be moved about a third axis for toe-in or toe-out positions thereof as required in water and ground operation.

Still another object is to provide novel means, whereby a float having three axes of movements may be locked or set to down, up, inboard or outboard angular float positions and to retracted or unretracted positions as required.

And yet a further object is to provide an aircraft landing gear for land or water including land wheels and floats, whereby the buoyancy of the float is near the center line of the axle of the wheel, so that bending moments due to water loads do not exceed the wheel load bending moments on the wheel axle.

With the above and other objects and advantages of the invention in view, the same is best understood by reference to the attached drawings, wherein two complete embodiments of the invention are illustrated.

In the drawings:

FIGURE 13 is a top plan view of the invention showing the forward swinging arms and arm links; the float nose wheels and tail wheels retracted when the floats are extended; the phantom lines of the left float show the outline of the float in the retracted position;

FIGURE 14 is a front elevation view of the aircraft of FIGURE 13 showing the floats in water landing position in solid lines and in retracted position in phantom lines;

FIGURE 15 is a cross section view of the right hand float with a broken away rear truss showing the connecting portion thereof and the universal joint connection thereof with the top of the float taken on line 15—15 in FIGURE 5;

FIGURE 16 is a top view of the universal joint connections of the rear truss on line 16—16 in FIGURE 15;

FIGURE 17 is a side elevation view of part of a float and the swing arm for connecting the universal connection of FIGURE 16 thereto taken on line 17—17 in FIGURE 15;

FIGURE 18 is a top view of the swing arm shown in FIGURE 17;

FIGURE 19 is a section taken on the line 19—19 in

Figure 7:
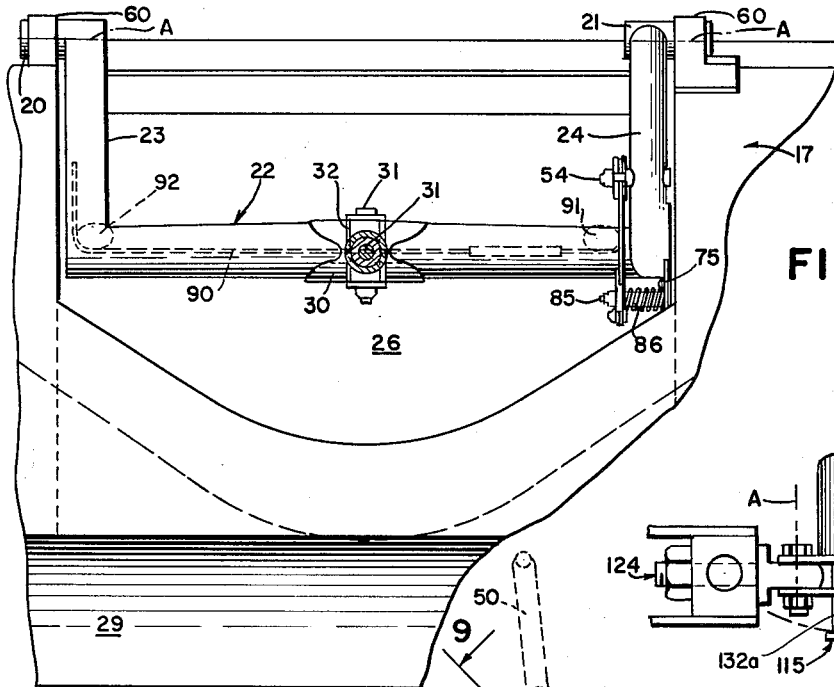
FIGURE 7 is a view taken along the line 7—7 of FIGURE 6.
Figure 12:
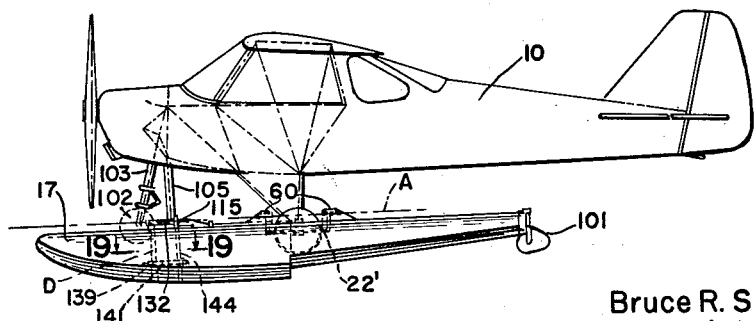
FIGURE 12 shows the floats in non-retracted water landing position, showing the swinging arm near the airplane nose wheel and cable connected pilot latch release to the swinging arm; and showing the aircraft landing wheels in the float wheel well with the airplane nose wheel; between the forepart of the respective floats.

FIGURE 12 and FIGURE 7 showing the swinging arm centering springs; and

Figure 20:
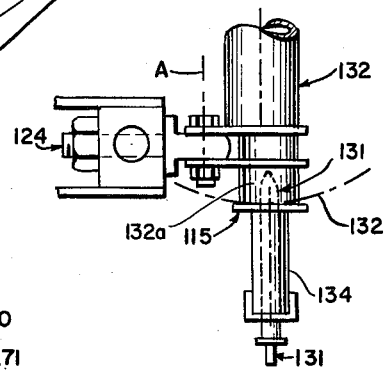

FIGURE 20 is a view similar to FIGURE 16 with the addition of an extension for receiving the latch pin for the swinging arm when controlling float positions for tricycle gear.

Referring in detail to the drawings and first with particular reference to FIGURES 1 through 5, there is shown an aircraft 10 with an under-carriage 11 comprising spaced cantilevered struts 12 and 13. Each strut is formed with a wheel axle 14 formed of a hollow tube section and a landing wheel 15 is journalled on each axle, such landing gear illustrated in these figures is typical of the Piper Cub airplane undercarriage, see FIGURE 6.

The present invention relates to the amphibious floats 17 for cooperative retractive association with each land wheel 15. These floats 17 since each are identical except for opposite hand are given a single reference numeral, as are their respective associated wheels 15. Each respective landing wheel and float provide for land or water landing or take-off of the aircraft.

Figure 5:
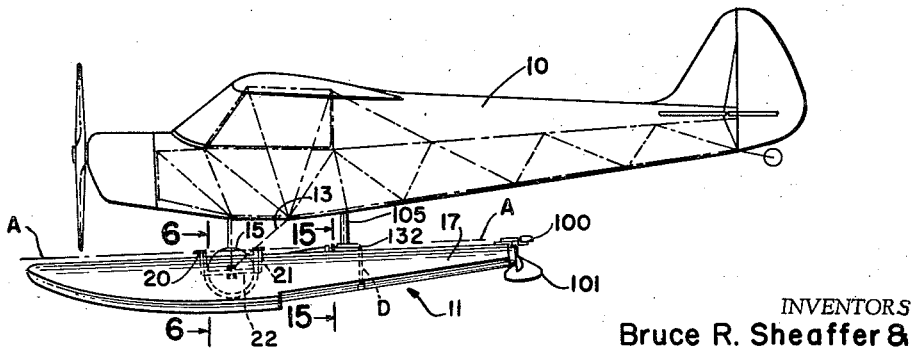
FIGURE 5 shows the float in non-retracted position in the proper float attitude about the first axis of movement thereof for water landing.
Figure 6:
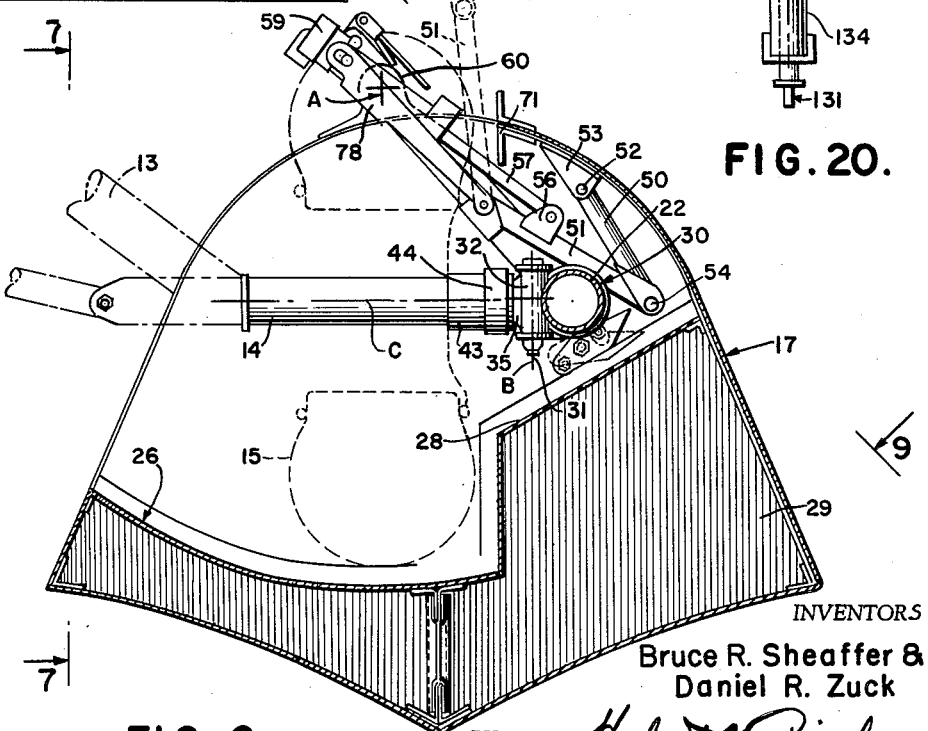
FIGURE 6 is a cross section view taken on the line 6—6 of FIGURE 5.
Figure 8:
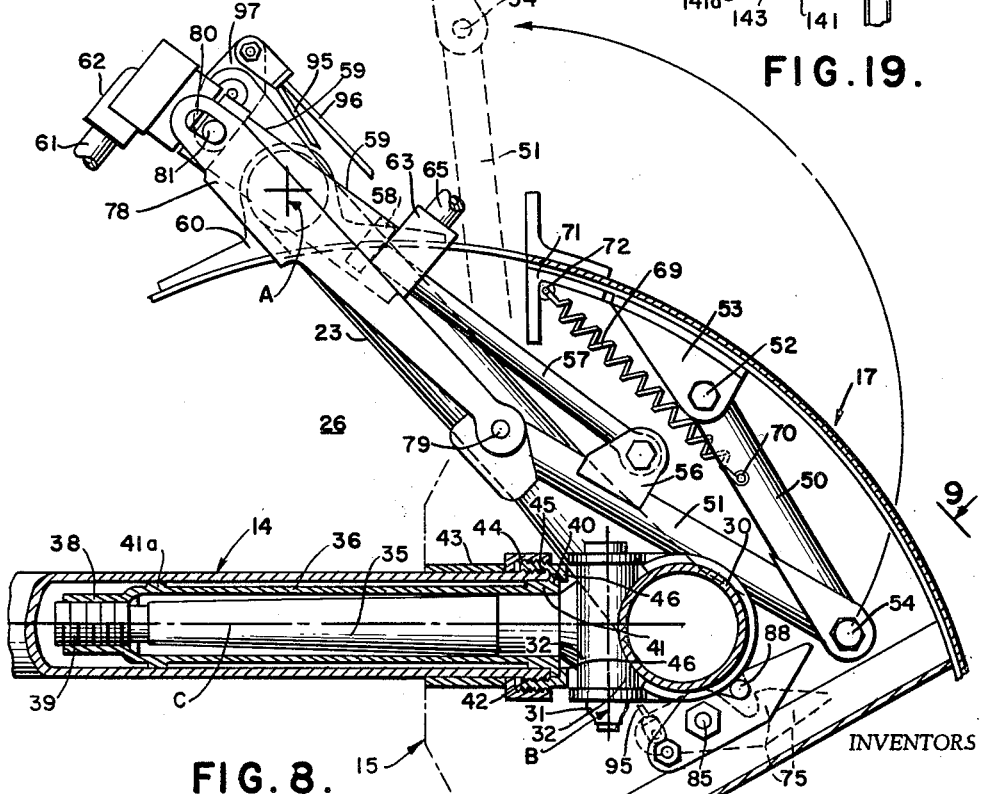
FIGURE 8 is a view similar to FIGURE 6, but showing float retracting linkage in solid and dotted lines for respective non-retracted and retracted positions of the float.
Figure 10:
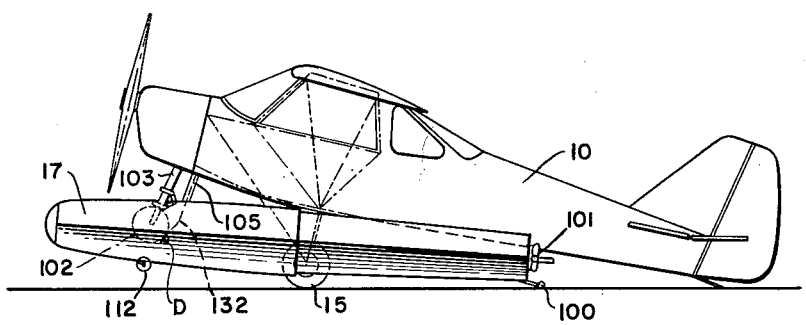
FIGURE 10 is a side elevation view of a second embodiment of the present invention, with the floats retracted and applied to a landing gear, including a nose wheel similar, for example, to that of a tri-cycle geared aircraft showing the same on the landing field and with the nose wheel lifted in the take-off and landing attitude with the float tail wheel on the airport runway.
Figure 11:
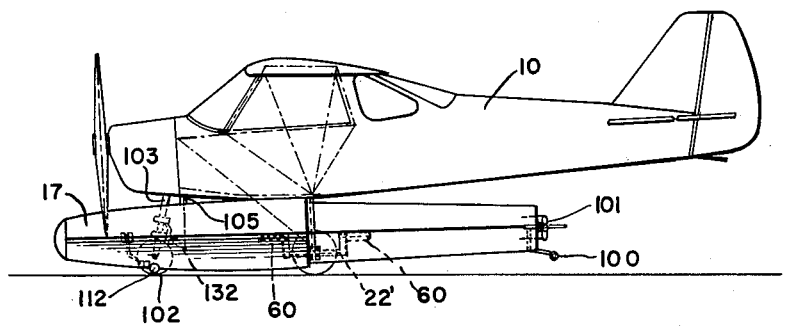
FIGURE 11 shows the airplane nose wheel in touchdown position with the float in retracted position, at the proper attitude for taxiing and with the float nose wheel on the airport runway.

The floats 17 are mounted with respect to the wheel 15 and cantilevered wheel axle 14, so as to have movement about three separate axes A, B and C, see FIGURES 6 and 8, for example. The first axis of movement is provided at pivot A of an elongated U-shaped float mounting bracket 22, which embraces the land wheel 15 and is suitably secured to the float 17 by bearing extensions 20 and 21 carried by bracket arms 23 and 24 in sockets 60 in the end walls of a wheel receiving well 26 formed in the float 17 intermediate its fore and aft ends, see FIGURES 1, 5 and 7. This elongated U-shaped float mounting bracket permits the float to swing laterally about the pivot axis A of the bracket as shown in the respective solid-dotted line positions representative of non-retracted water operation or of retracted land operation to uncover or to cover the landing wheels of the aircraft, see FIGURES 2, 3, 4 and 5. Also, with reference to FIGURES 7 and 8, each float is formed so the wheel well or pocket 26 has a lateral wheel receiving opening in the inboard side thereof and into which laterally extends the wheel axle 14 carried by the undercarriage strut 13, see FIGURE 6.

The mid-section of the U-shaped float bracket 22 is rigidly secured at its mid-point to the joint connection or sleeve 30 which provides the vertical pivot axis B for the lateral rocking movement of the float 17, see FIGURE 7. The free end of the wheel axle 14 extends into the well 26 above a stepped bottom 28 and above the lower buoyant hollow bottom portion 29 of the float. The vertical pin 31 and bushing 32 at right angles to the horizontal A axis of the float bracket provides the vertical pivot axis B for the toe-in or toe-out movement of respective floats 17, see FIGURE 6.

The up trim and down trim movement C axis, of the floats 17 is provided by the elongated bolt or spindle 35 secured to the bushing 32 at one end and the top of the spindle 35, which is formed with threads 39 at the opposite end thereof, see FIGURE 8. The spindles 35 extends at right angles from the bushing 32 of the coupling unit into the bore of the tubular member 36. This member 36 nests within the end of the hollow wheel axle 14 and is internally threaded with threads 38 at the opposite end from the end thereof adjacent the bushing 32 of the universal unit, which threads 38 are complementary to the threads 39 of the spindle tip to permit turning to obtain oscillatory movement on the C axis therebetween for up or down trim of a connected float 17 shown in FIGURES 3, 4, 10 and 11. Also, the elongated axle nested sleeve or tubular member 36 is formed to fit within the end of the hollow wheel axle 14 in secure coupled relation. For example, the end of the tubular member 36 is formed with an annular flange 40, and an annular centering surface 41 surrounding the flange 40, which cooperates with an annular spacer lug 41a adjacent the internally threaded end of the member 36 to center the member 36 with the bore of the hollow axle 14.

The hub of the wheel 15 fits on the axle 14, see FIGURE 8, which axle is formed on its free end with threads 42 and is held in position by a relatively larger spacer bushing 43 and a screw threaded external coupling nut 44 and an externally and internally threaded collar 45 formed with an inturned flange 46. This collar 45 with its external and internal threads and flanged end 46, with the coupling nut 44, couples the tubular member 36 to the axle 14 and permits the spindle 35 to be rotated, so the threads 39 on the tip end of the spindle turn in the threaded end 38 of the elongated tubular member 36. In this manner the third pivot axis C is provided to permit up trim or down trim to be imparted to the float members.

The foregoing described pivotal movement about the respective axis A is controlled by a pilot operated link and cable system as shown in FIGURES 6, 7 and 8, as hereinafter described.

Figure 9:
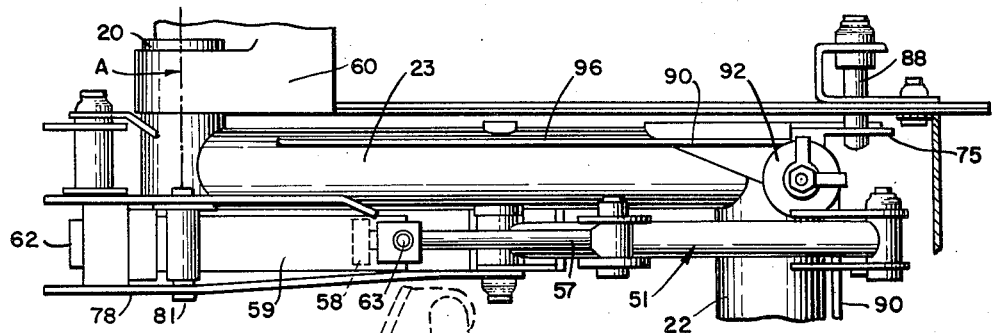
FIGURE 9 is a partial top plan view of the aft part of the wheel well, the down latch operating cable, downlock pin and latch and float retraction pivot axis, taken on the line 9—9 in FIGURES 6 and 8.

The float members 17 may be controlled for their lateral swinging retraction movement about axis A by float retracting links 50 and 51. The link 50 is connected to an inner top portion of the dome of the float by a pivot pin or bolt 52 in connection with a depending lug 53. The link 50 connects to link 51 by a pin or bolt 54. The link 51 connects through an upstanding lateral lug 56 carried thereby to the piston rod 57 from a piston 58 shown dotted in FIGURE 8, reciprocable in a hydraulic cylinder 59. This cylinder is pivotally mounted in a bracket 78 integral with the members 23 and 20 in FIGURES 7 and 9 and contains the piston 58 which is responsive to a source of pressure supplied to the upper and lower ends of cylinder 59 from connections 62 and 63 at the ends of the cylinder. This cylinder may be hereinafter termed the retraction cylinder. The lower part of the retraction cylinder is attached through the hydraulic port 63 to a return hydraulic line 65 which is a part of the hydraulic system connected to line 61 at the top of the cylinder.

The retraction cylinder piston is operated by the pilot, who adjusts a valve (not shown), which is positioned within his reach in the cockpit of the airplane. When the piston 58 is actuated from normal down position, the piston rod will pull upon the link member 51, and as the fluid pressure action continues on the underside of the piston these links are moved with their floating pivot 54 into substantial alignment. The link 50 when in the up position thereof maintains a pull and tension on overcenter up-locking springs 69, which connect at each opposite end of the lug 70 on link 50 and to an eyelet 72 on a double reinforcing means, such as a double longeron 71. As the links 50 and 51 are thus aligned and held over-center by springs 69 the amphibious float 17 is laterally sustained about axis A in its retracted or up position, as shown in FIGURES 2, 6, 8 and 4.

Figure 1:
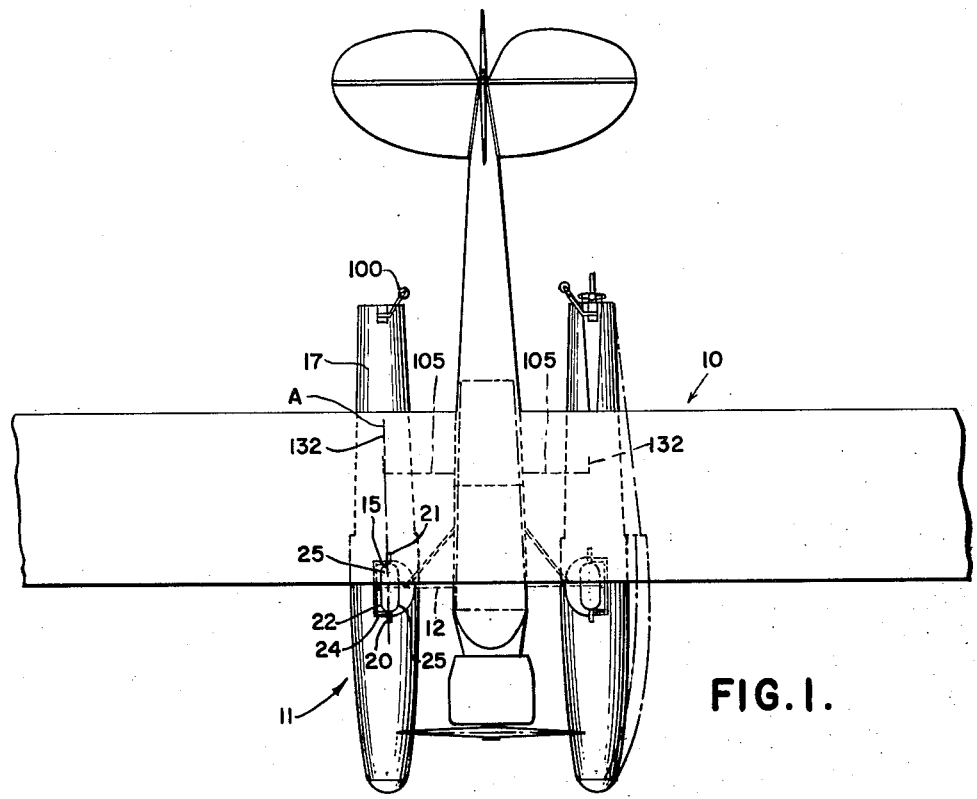
FIGURE 1 is a top plan view of an aircraft, with landing gear such as a Piper Cub aircraft, illustrating the amphibious float members in solid line normal water performing position and with the left float shown in the phantom line float position (retracted) when the land wheels are exposed.
Figure 2:
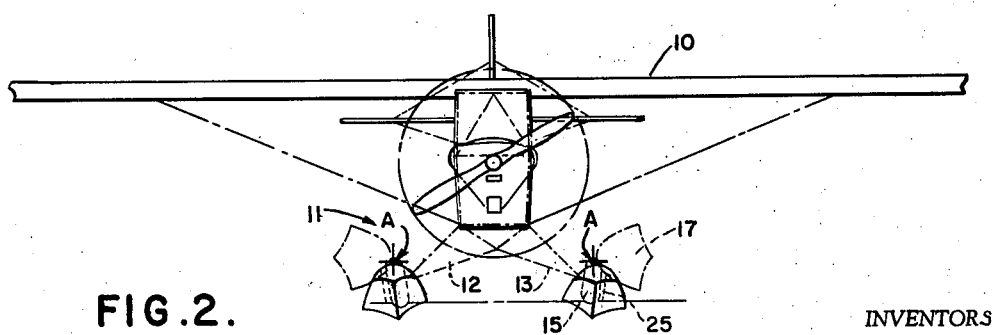
FIGURE 2 is a front elevation view of the aircraft and landing gear thereof of FIGURE 1 clearly illustrating the respective retracted and non-retracted float positions with respect to the ground wheels and showing the wheel float adapter well and the pivot axis or hereinafter called first axis of movement for the float retraction with respect to the wheel axle.
Figure 3:
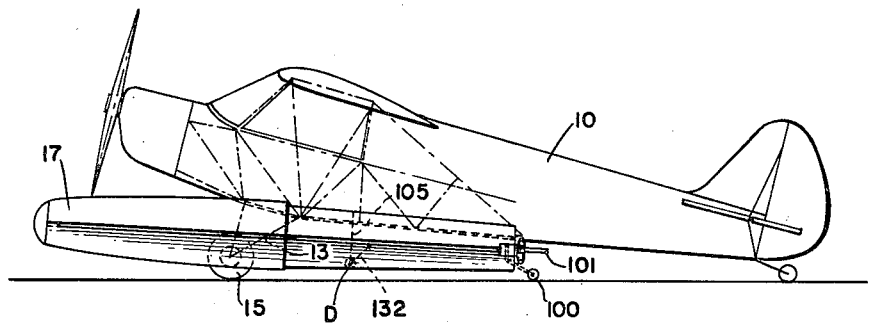
FIGURE 3 illustrates the movements of the float in retracted position about the second axis thereof to provide a float trim attitude with the aircraft in three point attitude on the ground with landing wheels exposed and engaged.
Figure 4:
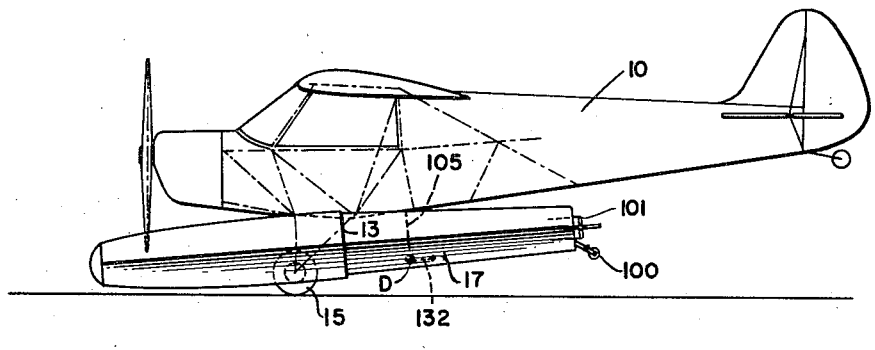
FIGURE 4 illustrates the float attitude for take-off with the retracted float down trimmed on the second axis of movement for take-off from or landing on the ground.

Following the operation of the retracting cylinder and piston by the pilot and at a predetermined lost motion position of the hydraulic cylinder a flexible cable 95 connected to the latch 75 is moved to thereby rock the spring biased latch means 75 and thereby release the float 17 for movement about axis A to its retracted or up position to expose ground wheel 15 as shown in FIGURES 2 and 14. This spring biased latch or float down lock 75 is rocked to release position by lost motion of the hydraulic cylinder supported in a bracket 78, FIGURE 8, having one end connected to the end of link 51 by pin 79 and its upper end formed with a vertical elongated slot 80 into which a cylinder support and stop pin 81 extends, see FIGURE 8. When the cylinder and piston are energized from intake 63 the cylinder moves down in the slot 80, until stop pin 81 engages the bottom of the slot 80 and cable 95 connected to the tail end of intermediately pivoted latch 75 rocks the latch on its intermediately positioned pivot pin 85, which pin carries the bias spring 86 therefor, see FIGURE 7, to release the latch head mounted on the cross beam 22 from the down lock pin 88. There are two such latches, one on each end of the cross beam 22.

The respective floats 17 are elevated to retracted position simultaneously for the right and left landing wheels. Also, a cross over cable 90 reeved around a pair of spaced apart sheaves 91 and 92, see FIGURES 7 and 9, the latches 75 through the lost motion in slot 80 and springs 86 are controlled to permit down-latching the float linkage 50–51.

When floats 17 are retracted the piston 58 is at the upper part of the cylinder 59 and the piston is retained in this position by fluid pressure on the lower side of the piston, until the pilot causes fluid to be supplied into the fittings 61–62 at the top of cylinder 59 and the fluid is relieved or exhausted from the underside of piston 58. This will cause the piston rod 57 to move the link 51 and return the associated linkage from the aligned position of the links 50–51 to the folded position thereof, as shown in FIGURES 6 and 8.

As the linkage is thus folded to the down position the nose of the latch 75 is pulled upward into its formerly latched position over the lock pin 88, by springs 86. The float is thus moved to down position for water landing operations.

Each float 17 is provided with alternatively usable means for land and water operation, respectively. For example, the aft end of one side of each float supports a ground wheel 100 for ground trim engagement when the float is retracted for the airplane to land on the ground surface, while the keel side of the float at the aft end thereof supports a rudder appendage arrangement 101 for use in the water.

A second embodiment of the invention is illustrated in FIGURES 10 through 14, inclusive. This embodiment is identical to the embodiment of FIGURES 1 through 10, inclusive, except for the showing of the floats 17 applied to a tricycle landing gear, including land wheels 15' and a nose wheel 102.

The nose wheel 102 is supported by the usual centrally depending oleo or shock strut 103. An arrangement comprising a cross bar 104 connected to spaced struts 105 and 106, which struts are carried by each respective float 17', are connected aft of the nose wheel strut 103 to the airplane fuselage.

Each float is provided with a nose wheel 112 and as shown in FIGURES 10 through 14, inclusive. Likewise, each float has truss means 114 comprising members 104, 105 and 106 connected to the float dome, see FIGURE 15.

This truss is provided with a universal coupling yoke 116 having two axes of movements B' and C', FIGURES 15 and 16, to conform and coact with the B and C axes of the main or centrally mounted wheel and axle section of the floats. This universal coupling yoke connects to an upstanding bifurcated lug 115 on the top of the float 17, see FIGURE 15, and comprises a centrally apertured bearing yoke 116 with upstanding bearing pins 117 and 118. To the bearing means 119 and 120 in which are journalled the upstanding projecting bearing pins 117 and 118 are secured the members 105 and 104. Mounted in the central aperture of the coupling yoke 116 and projecting laterally from the yoke is a rotatable spindle or pin 124 with an apertured flat end 125, which is secured between the bifurcations 121 and 122, FIGURES 16 and 18, by suitable means, such as a nut 126 and a bolt 127. The bifurcations 121 and 122 are an integral fitting with the arm 132, and they are not attached to the lug 115. The bifurcated lug 115 is formed with a cut-away or an open hook-like portion 128 on the inboard side thereof to permit the float 17 with the lug 115 to swing outwardly on a spindle or pin 127 extending through the top outboard corner of the bracket 115. The swinging outboard movement of the float 17 corresponds to the movement on the C axis of the float and occurs when the float 17 is in the retracted position and swung on the trim axis as is shown in FIGURES 3, 4, 10 and 11.

Also, the aft end of the float is locked when in down or non-retracted position by a latch pin 131, which is releasable from a swinging arm 132 at the top of the float and movable from engagement with a socket means 134 projecting from the float dome. The swinging arm 132 rotates on an axis D and is journalled to the float dome by the bearing block. This permits the retracted float to trim on the axis C, as shown in FIGURES 3, 4, 10 and 11.

Thus a retractive movement of the float through the foregoing described interconnecting cable and latch means to the operatively associated swinging arm and the forward or aft truss supported universal joint depending on tricycle or cub type gear and float connections, permits a coactive unified operation to the respective float retracting and non-retracting positions.

Figure 19:
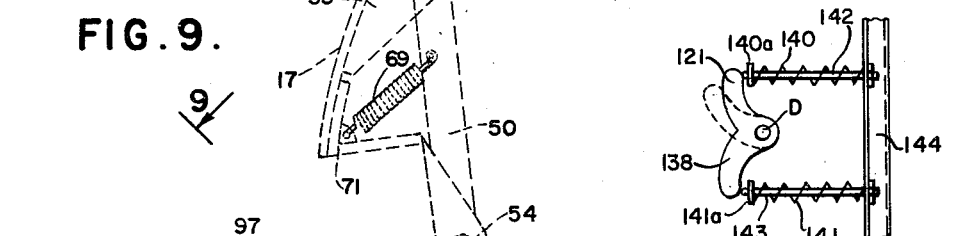

Each float 17 has a pivot pin D, which is at right angles to the float pivotal axis A, see FIGURE 17. On this pin D is pivoted the swing arm 132, which swings with the movements of the float to either retracted or non-retracted position. As the floats swing up or down to these positions, there is a centering means 139, see FIGURES 12, 17 and 19, which by means of a toggle link 138 and springs 140 and 141 with thrust washers 140a and 141a coiled around guide rods 142 and 143 and secured to bulkhead 144 serve to align the swinging arm 132 with the A axis.

Referring to FIGURE 20, there is provided an extension 132a to the swinging arm 132. This extension is needed on tricycle gear, as disclosed in FIGURES 10 through 14 permit the arm 132 to swing both clockwise and counter-clockwise from the pin 131. As the arm 132 thus is adapted to swing in both directions, it is desirable to provide the centering means 139 comprising a toggle arm 138, centering springs 140 and 141 on shafts 142 and 143 secured to bulkhead 144, see FIGURE 19. These springs align the swinging arm 132 with the A axis and permit the arm to be locked in alignment with the A axis, thereby permitting the float 17 to be rotated to the down and locked position for water landing, as shown in FIGURES 5 and 12.

Without further description it is believed that the advantages of the present invention over the prior art is apparent and while only two embodiments of the same are illustrated, it is to be expressly understood that the same is not limited thereby as various changes may be made in the combination and arrangement of the parts illustrated, as will likely appear to others and those skilled in the art. For a definition of the scope or limits of the invention, reference should be had to the appended claims.

What is claimed is:

1. An undercarriage for aircraft providing for land and water takeoff and landing comprising two landing struts, a landing wheel connected to each strut, and a float secured to the end of each axle with means for relative motion of the float in three perpendicular planes for lateral pivoted movement about a first axis into a retracted land operating position and into a non-retracted water operating position with respect to said wheels, said float being formed with an open sided wheel well centered with respect to the end of each strut, an elongated support bracket in the well spanning the outboard side of an adjacent wheel and joining the float on a horizontal axis, said support bracket being horizontally pivoted to the floats and having two axial pivots at substantially right angles to each other secured in and projecting outwardly from said wheel axle, whereby said float is provided with a trim axis, a toe-in and a toe-out axis and a retractable pivot axis from water to land operation.

2. An undercarriage for aircraft as described in claim 1, wherein said float has mechanical means and extensible linkage connected to said float to mechanically pivot the float to and from retractable and non-retractable position with respect to a respectively adjacent wheel.

3. An undercarriage for aircraft as described in claim 1, wherein said float has controlled down locking means for the non-retracted position and controlled up-locking means in the retractable position thereby preventing movement about said first axis with respect to a respectively adjacent wheel.

4. An undercarriage for aircraft as described in claim 1, wherein the said float has a hydraulic cylinder and piston and an extensible linkage connected to said piston and to said bracket in said wheel well and the float is hydraulically pivoted about said first axis to and from retractable and non-retractable position with respect to a respectively adjacent wheel.

5. An undercarriage for aircraft providing for land and water takeoff and landing comprising a land wheel and an axle for each wheel, and a float mounted on each axle for lateral pivotal movement on a first axis into a retracted land operating position and into a non-retracted water operating position with respect to said wheels, said float being formed with an open side wheel well intermediate the fore and aft of said float, an elongated support bracket in the well spanning the outboard side of an adjacent wheel, said bracket being horizontally pivoted to a universal joint having two axial pivots at substantially right angles to each other secured in and projecting outwardly from said wheel axle, whereby said float is provided with a free trim axis, a toe-in and a toe-out axis and a said first-mentioned retractable pivot axis from water to land operation, an hydraulic cylinder and piston and an extensible linkage connected to said piston and to the said bracket in said wheel well, and means to lock each of said floats into non-retracted water operating position after said floats are moved by said cylinder and piston with its extensible linkage independently of said free trim axis and said toe-in and said toe-out axis.

6. An undercarriage for aircraft as described in claim 5 having associated hydraulic means to lock the float down in the non-retractable position and to lock the float up in the rectractable position on said first axis with respect to a respectively adjacent wheel.

7. An undercarriage for aircraft as described in claim 5 wherein said lock means comprises a swingable latch and lock pin, said latch being movable by means actuated by said hydraulic cylinder, said cylinder being slightly movable to effect a predetermined latch actuating pull.

8. An undercarriage for aircraft providing for land and water takeoff and landing comprising spaced landing wheels and axles for said wheels, and a float mounted for three axes of movement on each axle for lateral pivotal movement on a first axis into a retracted land operating position and on said first axis into a non-retracted water operating position with respect to said wheels, said float being formed with an open sided wheel well positioned intermediate the fore and aft ends thereof, an elongated U-shaped bracket in the well spanning the outboard side of an adjacent wheel and joining the float on a horizontal axis, said bracket being horizontally pivoted to the floats and having two axial pivots at substantially right angles to each other secured in and projecting outwardly from said wheel axle, whereby said float is provided with a free trim on a second axis, a toe-in and toe-out axis at right angles to said first-mentioned axis for retraction to land operation, an arm spaced longitudinally from said U-shaped bracket pivoted on an axis at right angles to said longitudinal axis of the float, said arm being swingable into longitudinal alignment with said float axis, lock means operatively associated with said arm, said lock means locking said arm in such aligned position, and centering means for aligning and moving said arm to said aligned locked position, whereby the float is rotatable on said first axis to the down and locked position for water landing, while maintaining said trim axis free to trim the angle of said float.

9. An aircraft landing gear comprising undercarriage strut means, axles carried by said strut means, wheels journalled on said axles and a float pivotally secured for movement about three axes to the end of each of said axles intermediate the fore and aft ends thereof adjacent the outboard side of each of said wheels, said float being formed with a wheel well positioned substantially center of the fore and aft ends of the float having a wheel entry opening on the inboard side to enclose an adjacent wheel in said well in a downwardly pivoted position of the float on one of said axes and to uncover the ground engaging portion of the wheel in an upwardly pivoted position of the float, a pivot rod carried by said float toward the aft end thereof, an arm swingable in said pivot, a toggle link secured to said rod, and spring means engageable to each end by said link to center said float along the longitudinal axis of said aircraft when said float is in either a retracted or an unretracted position about a second of said axes.

10. An aircraft land gear comprising undercarriage strut means, axles carried by said strut means, wheels journalled on said axles and a float pivotally secured for movement about three axes to the end of each of said axles intermediate the fore and aft ends thereof adjacent the outboard side of each of said wheels, said float being formed with a wheel well positioned substantially center of the fore and aft end of the float having a wheel entry opening on the inboard side to enclose an adjacent wheel in said well in a downwardly pivoted position of the float and to uncover the ground engaging portion of the wheel in an upwardly pivoted position of the float, a swinging arm mounted on a pivot rod extending from top to bottom of the float, whereby said float is free to move about one of said axes as said arm swings on said pivot rod retracted or unretracted position, and centering means for aligning said float about a second of said axes along a fore and aft line with respect to said aircraft.

11. An aircraft landing gear as described in claim 10, wherein said centering means comprises a toggle lever mounted on said pivot rod, and spring means engaging each end of said toggle lever, said spring means being compressible as the said lever is moved either clockwise or counter-clockwise by movement imparted thereto from the direction of swing of said swinging arm.

12. An aircraft landing gear for land or water including land wheels and floats, said floats being movable to permit land operating positions or to water operating position with respect to said wheels, the buoyancy of said floats being near the center line of the wheel of each respectively associated wheel, and said floats being universally mounted for three axes of movement for water operation whereby the bending moments due to water loads during water operation do not exceed the wheel load bending moments on the respective wheel axles regardless of operating positions of said floats during water operation.

13. An aircraft landing gear comprising undercarriage strut means, axles carried by said strut means, wheels journalled on said axles and a float pivotally secured to the end of each of said axles having means for relative motion of the float in three perpendicular planes, means to upwardly pivot the floats and to uncover the ground engaging portion of the wheels, and means to downwardly pivot the floats for water operation to make the aircraft amphibious.

14. An aircraft landing gear comprising undercarriage strut means, axles carried by said strut means, wheels journalled on said axles and a float pivotally secured to the end of each of said axles having means for relative motion of the float in three perpendicular planes adjacent the outboard side of each of said wheels, said float being formed with a wheel well positioned intermediate the ends of the float having a wheel entry opening on the inboard side to enclose an adjacent wheel in said well in a downwardly pivoted position of the float and to uncover the ground engaging portion of the wheel in an upwardly pivoted position of the float, each of said axles comprising a universal joint means in each end thereof on the outboard side of each wheel and said float having attachment means secured to the end section of said universal joint means, whereby said float may be moved about three axes of movement.

References Cited in the file of this patent
UNITED STATES PATENTS

| | | |
|---|---|---|
| 1,106,020 | Wilds | Aug. 4, 1914 |
| 1,929,630 | Duell | Oct. 10, 1933 |
| 2,715,000 | Janney | Aug. 9, 1955 |